Feb. 1, 1938. A. E. ZIMMERMAN 2,107,228
CONDIMENT HOLDER
Filed Aug. 6, 1936
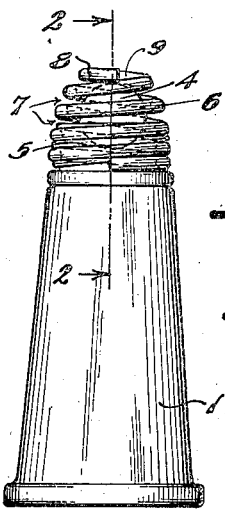
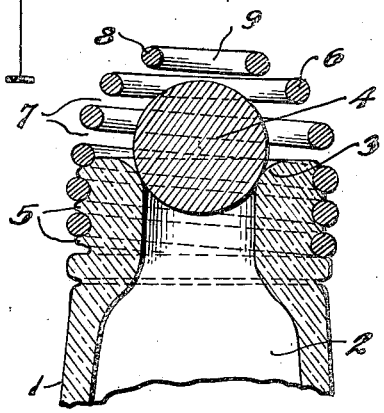
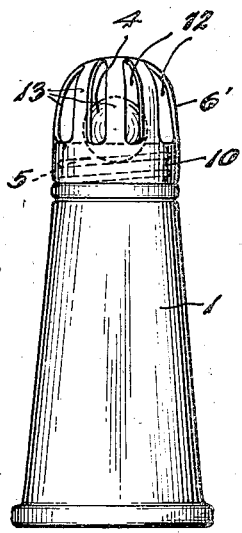
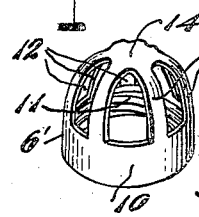
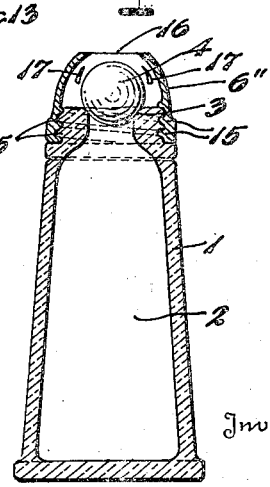
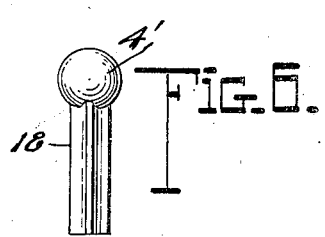
Inventor
A. E. Zimmerman
By Robb & Robb
Attorneys Patented Feb. 1, 1938

2,107,228

UNITED STATES PATENT OFFICE 2,107,228

CONDIMENT HOLDER

Axel E. Zimmerman, West Palm Beach, Fla.

Application August 6, 1936, Serial No. 94,668

1 Claim. (Cl. 65—45)

This invention relates to condiment holders, and more particularly to an improved so-called shaker top for salt, pepper, sugar, spice, or similar containers or cellars.

While the invention may have quite a number of different forms, several of which are illustrated in the drawing and hereinafter described, each form is endowed with the following primary characteristics and objects: simplicity of construction; low cost of production; few parts, none of which can get out of order; efficient regulation of the flow of the condiment that insures self-closing of the container so as to maintain the condiment dry and always ready for use without any tendency to clog the holder or shaker top; attractiveness of appearance; etc.

Other and further objects and advantages will be hereinafter described, and the novel features thereof defined by the appended claim.

In the drawing,—

Figure 1 is a view in side elevation of a condiment holder having one form of my improved shaker top or cover applied to the condiment container or receptacle.

Figure 2 is an enlarged, fragmentary sectional view taken approximately on the line 2—2 of Figure 1.

Figure 3 is a view generally similar to Figure 1, and showing another form of shaker top applied to the condiment receptacle or container.

Figure 4 is a perspective view of the shaker top or cover which is shown in side elevation in Figure 3.

Figure 5 is a vertical sectional view through a condiment holder, and showing a still further modified form of shaker top or cover applied to the condiment container, and Figure 6 is a detail view in side elevation of a modified form of valve means which may be used with any of the various forms of shaker tops illustrated in the other figures, in substitution for the ball valves shown in these other figures.

Like reference characters designate corresponding parts in the several figures of the drawing.

Referring first to the form of my invention shown in Figures 1 and 2, 1 designates a receptacle or container which may be of any conventional type or other suitable form, the container being made of glass, china, metal, or any other suitable material, forming a chamber 2 adapted to receive the condiment or other materials therein. This container 1 is open at its upper end, and this opening is preferably bevelled or flared outwardly, as at 3, forming a valve seat for a valve member 4 which, as shown in Figures 1 and 2, has the form of a ball which may be composed of glass, clay, or any other suitable material, preferably of some type which will not be readily corroded by the condiment. The relative sizes of the valve seat 3 and the valve 4 are preferably such that when the valve 4 is seated on the seat, substantially one-third of the ball valve will be received within the open end of the container 1. However, it is to be understood that I do not wish to be limited to these precise proportions.

On the outer wall of the container 1, adjacent to the upper open end of the container, are provided suitable cover attaching instrumentalities 5, which, as shown in the drawing, have the form of threads, according to the well known construction of containers for salt, pepper, and other condiments. Removably mounted on the upper open end of the container 1, and interlockingly engaging with the cover attaching instrumentalities or threads 5, is a cover or shaker top, generally designated 6. According to the form illustrated in Figures 1 and 2, the cover 6 is composed of a wire-like member which is coiled about a common axis in helical form, providing a plurality of superposed turns of wire. The turns at the bottom end of the cover are so arranged as to be capable of being screwed onto the threads 5 of the container, the threads 5 being received between the lowermost turns or coils, thereby becoming interlockingly engaged with the latter to secure the cover onto the container, as best seen in Figure 2. Preferably, the cover 6 tapers upwardly and inwardly, as by winding the uppermost turns so that they progressively approach the axis of the cover. This gives a neat and attractive appearance to the cover and produces a form which, in effect, constitutes a cage for the valve 4. Spaces 7 intermediate the turns or coils constitute discharge openings, permitting the condiment to be discharged readily in a manner which will hereinafter become more apparent. The end turn or coil 8 at the upper extremity of the cover 6 is substantially closer to the axis of the cover than the other turns, and defines an opening 9 which is co-axial with the open end of the container 1, and constitutes another valve seat. This end turn 8 is spaced from the upper open end of the container 1 a sufficient distance to allow the valve 4 to have a limited, free movement away from the valve seat 3 of the container 1. In other words, the valve 4 is loosely mounted within the cover or top 6.

Now when the condiment holder is disposed in an upright or substantially upright position, as shown in Figures 1 and 2, the valve 4 normally seats on the seat 3, thereby effectively closing the open end of the container 1 and preventing the entrance of dust, moisture, and the like into the container 1. Accordingly, the condiment cannot become contaminated, nor damp, and is maintained in a fit and dry condition, ready for use at all times. By inverting the holder, the ball valve 4 will be displaced by gravity from the seat 3 and move a limited distance away from the seat 3 until it rests upon the cover seat formed by the end turn 8 of the cover. In so opening the end of the container, the condiment is allowed to freely flow out into the cover and is distributed laterally and discharged through the spaces 7 between the turns of the cover or shaker top. If desired, a slight shaking motion may be imparted to the holder to effectively distribute the condiment discharge, with or without displacing the valve 4 from its seat on the cover. Of course, if the shaking motion is sufficiently great to displace the valve 4 from its cover seat, some of the condiment will be discharged through the opening 9 at the extreme end of the cover.

It is to be understood that I do not wish to be limited to the precise tapered form of cover as illustrated in Figure 2, as the wire-like member may be wound in such a manner as to produce other attractive and effective shapes while at the same time preserving the cage-like function, which is one of the primary characteristics of the particular form of cover as shown in the drawing.

Passing now to the construction illustrated in Figures 3 and 4, there is shown a modified form of cover or shaker top, generally designated 6', removably mounted on the upper open end of the container 1, the latter having the same form and construction as shown in Figures 1 and 2, although not necessarily so. The cover 6' is preferably made in one-piece from any suitable material, as, for example, thin sheet metal, having a dome or crown-like form. The lower end 10 of the cover 6' is internally threaded, as at 11, or otherwise provided with suitable instrumentalities for removably engaging the cover attaching instrumentalities or threads 5 on the container. A plurality of elongated, laterally-disposed openings 12 are provided in the cover 6', each extending from a point near the upper end of the cover to a point near the bottom thereof, these openings constituting discharge openings, and being separated from each other by web-like portions 13. The extreme upper end of the cover 6' terminates in a closed tip 14, which constitutes a valve seat for the valve 4, which is likewise loosely mounted within the cover as in the form of the invention shown in Figures 1 and 2. The cover seat part 14 is spaced sufficiently far from the upper open end of the container 1, when the cover 6' is mounted thereon, to allow the valve 4 to have a limited, free movement towards and away from the upper open end of the container 1, the latter forming a seat for the valve 4 on which the valve is adapted to be seated to close the container, as, when the holder is disposed in an upright position. The function and operation of the construction shown in Figures 3 and 4 are substantially the same as in Figures 1 and 2, and, therefore, will be readily understood without further description.

In Figure 5, a still further modified form of cover 6'' has been illustrated, this cover likewise being preferably of one-piece construction and composed of any suitable material, such as metal, hard rubber, "Bakelite", Celluloid, or the like. Means, such as the threads 15, are provided in the lower end of the cover 6'' for detachably engaging the threads 5 on the container 1. The body of the cover tapers upwardly and inwardly and terminates at its upper end in an opening 16, which is coaxial with the upper open end of the container 1, the latter forming the valve seat 3, and the opening 16 forming another valve seat. The valve 4 is loosely mounted within the cover 6'' and has a limited, free movement between the respective seats on the container and on the cover. 17 designates a plurality of laterally-disposed openings which are provided in the cover 6'' below the opening 16, and which constitute condiment discharge openings. When the holder is disposed in an upright position, the valve 4 normally rests upon the seat 3 and closes the container 1. By tilting or inverting the holder, the valve 4 is displaced from the seat 3, and drops onto the cover seat formed by the opening 16, thereby permitting the condiment to flow out of the container into the cover where it is distributed and discharged through the lateral openings 17. The discharge can be further regulated or controlled by imparting a shaking motion to the holder, which, if sufficient to displace the valve 4 from the cover seat, will allow the condiment to be discharged through the opening 16 as well as through the openings 17.

In lieu of the spherical or ball valve 4, which has been illustrated in Figures 1 to 5 inclusive, the valve illustrated in Figure 6 may be substituted therefor. This modified valve of Figure 6 embodies a ball-shaped or spherical part 4', from one side of which extends a stem 18, the latter being of such size as to fit loosely within the upper open end of the container 1, so as to allow the ball-shaped portion 4' to freely move towards and away from the seats respectively on the upper end of the container and the upper end of the cover or shaker top. Sufficient clearance should be afforded between the stem 18 and the walls of the bore of the container to permit the condiment to pass from the chamber 2, around the stem, and into the cover when the holder is tilted or inverted, with or without a shaking motion. To this end, the stem 18 may be fluted or ribbed, if desired. The use of the ball valve 4, or the valve shown in Figure 6, with any of the various forms of covers illustrated in Figures 1 to 5 is a matter of choice, and it is to be understood that I do not wish to be restricted to either one or the other for any particular form of cover.

While the specific details have been herein shown and described, the invention is not confined thereto, as changed and alterations may be made without departing from the spirit thereof as defined by the appended claim.

What is claimed is:—

A cover or shaker top adapted to be removably mounted on an open-ended condiment container having cover attaching instrumentalities disposed on the outer wall thereof adjacent to the open end, said cover comprising a wire-like member coiled about a common axis in helical form, providing a plurality of superposed turns, the turns of one end of the cover being adapted to interlockingly engage with the cover attaching instrumentalities on the container, and the remaining turns progressively approaching the axis of the cover, the end turn of the cover opposite to the container engaging end defining an opening and being spaced from the open end of the container when the cover is mounted thereon, and constituting a valve seat, there being spaces between the turns of the wire-like member constituting condiment discharge openings, and a spherical shaped valve member normally loosely disposed within the cover and being adapted to seat on and close the open end of the container when the holder is in one position, and adapted to have a limited movement away from the end of the container towards the seat afforded by the cover when the holder is in another position, permitting discharge of the condiment between the turns of the cover intermediate the ends of the latter, said end turn of the cover having a diameter less than the diameter of the valve member and being spaced from the mouth of the container a sufficient distance to permit free flow of the condiment therefrom but less than the diameter of the valve member so as to control the flow of the condiment laterally through the coils.

AXEL E. ZIMMERMAN.